(12) United States Patent
Juffa et al.

(10) Patent No.: US 8,327,123 B2
(45) Date of Patent: *Dec. 4, 2012

(54) MAXIMIZED MEMORY THROUGHPUT ON PARALLEL PROCESSING DEVICES

(75) Inventors: Norbert Juffa, San Jose, CA (US); Brett W. Coon, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/069,384

(22) Filed: Mar. 23, 2011

(65) Prior Publication Data

US 2011/0173414 A1   Jul. 14, 2011

Related U.S. Application Data

(63) Continuation of application No. 11/748,298, filed on May 14, 2007, now Pat. No. 7,925,860, which is a continuation-in-part of application No. 11/433,310, filed on May 11, 2006, now abandoned.

(51) Int. Cl.
*G06F 9/30* (2006.01)

(52) U.S. Cl. ...................................... 712/245

(58) Field of Classification Search ................ None
See application file for complete search history.

(56) References Cited

U.S. PATENT DOCUMENTS

| | | | |
|---|---|---|---|
| 5,440,687 A | 8/1995 | Coleman et al. | |
| 6,675,285 B1 | 1/2004 | Mang et al. | |
| 7,447,873 B1 | 11/2008 | Nordquist | |
| 7,475,392 B2 | 1/2009 | Eichenberger et al. | |
| 7,477,260 B1 | 1/2009 | Nordquist | |
| 7,584,342 B1 | 9/2009 | Nordquist et al. | |
| 7,594,095 B1 | 9/2009 | Nordquist | |
| 7,634,637 B1 | 12/2009 | Lindholm et al. | |
| 7,640,284 B1 | 12/2009 | Goodnight et al. | |
| 7,750,915 B1 | 7/2010 | Acocella et al. | |
| 7,788,468 B1 | 8/2010 | Nickolls et al. | |
| 7,836,116 B1 | 11/2010 | Goodnight et al. | |
| 7,861,060 B1 | 12/2010 | Nickolls et al. | |
| 7,925,860 B1 | 4/2011 | Juffa | |
| 2007/0130447 A1 | 6/2007 | Coon et al. | |

OTHER PUBLICATIONS

Office Action dated Mar. 31, 2011 from U.S. Appl. No. 11/433,310, 8 pages.

*Primary Examiner* — Robert Fennema
(74) *Attorney, Agent, or Firm* — Kilpatrick Townsend & Stockton LLP

(57) ABSTRACT

In parallel processing devices, for streaming computations, processing of each data element of the stream may not be computationally intensive and thus processing may take relatively small amounts of time to compute as compared to memory accesses times required to read the stream and write the results. Therefore, memory throughput often limits the performance of the streaming computation. Generally stated, provided are methods for achieving improved, optimized, or ultimately, maximized memory throughput in such memory-throughput-limited streaming computations. Streaming computation performance is maximized by improving the aggregate memory throughput across the plurality of processing elements and threads. High aggregate memory throughput is achieved by balancing processing loads between threads and groups of threads and a hardware memory interface coupled to the parallel processing devices.

20 Claims, 7 Drawing Sheets

```
        ┌ if (n < tMin) {
        │     nbrCtas = 1;
402 ─┤      elemsPerCta = n;
        │     threadsPerCta = tMin;
        └

┌ } else if (n < (gridW*tMin)) {
        │     nbrCtas = ((n+tMin-1)/tMin);
404 ─┤      threadsPerCta = tMin;
        │     elemsPerCta = threadsPerCta;
        └

┌ } else if (n < (gridW*tMax)) {
        │     int grp;
        │     nbrCtas = gridW;
406 ─┤      grp = ((n+tMin-1)/tMin);
        │     threadsPerCta = (((grp+gridW-1)/gridW)*tMin);
        │     elemsPerCta = threadsPerCta;
        └

┌ } else {
        │     int grp;
        │     nbrCtas = gridW;
408 ─┤      threadsPerCta = tMax;
        │     grp = ((n+tMin-1)/tMin);
        │     grp = ((grp+gridW-1)/gridW);
        │     elemsPerCta = grp*tMin;
        └ }
```

FIG. 4

MAXIMIZED MEMORY THROUGHPUT ON PARALLEL PROCESSING DEVICES

CROSS-REFERENCE TO RELATED APPLICATION

This application is a continuation of application Ser. No. 11/748,298, filed May 14, 2007, which is a continuation-in-part of application Ser. No. 11/433,310, filed May 11, 2006, each entitled "Maximized Memory Throughput on Parallel Processing Devices," which are incorporated by reference.

BACKGROUND OF THE INVENTION

The present invention applies to the field of parallel processing devices composed of multiple processing elements, where each processing element executes multiple threads. More particularly, the present invention relates to improved, or ideally, maximized memory throughput on parallel processing devices for streaming computations.

Streaming computations, where the elements of a stream can be processed independently of each other, are especially well suited to a parallel processing device. Each processing element, and each thread, of the processing device can read in stream elements, process them, and store out the results without necessitating communication between threads of processing elements, or processing elements in general. In a streaming computation on a parallel processing device, each data element of a stream is read from a memory coupled to the processing device, combined with other data through appropriate logic or arithmetic operations, and the result is stored back into memory. Examples of such streaming computations are operations in BLAS (Basic Linear Algebra Subroutines), an industry-standard way of dealing with vectors and matrices, subdivided into BLAS-1 functions (vector-vector), BLAS-2 (matrix-vector), and BLAS-3 (matrix-matrix).

Streaming computations can be subdivided into two classes: those that benefit from caching, and those that do not benefit from caching. For example, a matrix multiply computation can benefit from caching, whereby private memories on chip, for example, provide a software-controlled cache for the computation.

On the other hand, streaming computations that do not benefit from caching, e.g., MPEG stream computations, are such because each piece of data is basically used once in the computation. Generally, the computation involves reading first data for a portion of the stream from memory, performing a computation on the first data, returning a result back to memory, reading second data for a second portion of the stream, computing on the second portion, storing results for the second portion, and so on. In this computational model, there is no data reuse, negating any advantages that could be had from caching.

BRIEF SUMMARY OF THE INVENTION

For streaming computations, processing of each data element of the stream might not be computationally intensive and thus processing may take relatively small amounts of time to compute as compared to memory accesses times required to read the stream and write the results. Depending on memory access times and the amount of computational work per element, this can be true regardless of whether the computation benefits from caching. Therefore, memory throughput can limit the performance of streaming computations. Generally stated, provided are methods for achieving improved, optimized, or ultimately, maximized memory throughput in memory-throughput-limited streaming computations. Streaming computation performance is maximized by optimizing the aggregate memory throughput across the plurality of processing elements and threads. High aggregate memory throughput is achieved by balancing processing loads between threads and groups of threads and a hardware memory interface coupled to the parallel processing devices.

In one aspect, in a system including a number of parallel processing devices coupled to a memory, a method for improved throughput in a memory-bandwidth-limited computation on a data stream stored in the memory comprises approximately balancing processing load across the parallel processing devices so that a substantially maximized number of processing devices are configured to access the data stream in parallel; and accessing respective portions of the data stream stored in the memory by each thread of the parallel processing devices based on a thread identifier for the thread.

In another aspect, a method comprises loading a stream of a plurality of data elements into a memory coupled to a processing device, the processing device including a first processing engine in parallel with a second processing engine; processing a first element of the data stream with a first thread on the first processing engine, including requesting access to the first element at a first location in the memory; in parallel with processing the first element, processing a second elements of the data stream with a second thread on the second processing engine, including requesting access to the second element at a second location in the memory offset from the first location by an amount dependent on respective thread identifiers of the first and second threads; and making a single memory access to the first location and the second location to obtain the first element and the second element substantially simultaneously.

In another aspect, a system comprises a first processing engine configured to run a first thread; a second processing engine configured to run a second thread; and a memory interface configured to couple the first processing engine to a first portion of a stream of data elements stored in a memory and couple the second processing engine to a second portion of the stream of data elements stored in the memory; the first processing engine configured to access the first portion of the stream substantially simultaneously with the second processing engine to form a wide aligned access to memory.

In still another aspect, a method for processing an input data stream having a number of input data elements includes storing the input data elements of the input data stream in memory. A number of thread arrays to be executed concurrently by parallel processing hardware are defined. Each thread array includes a number of concurrent threads, with each thread having a unique thread identifier and each thread array having a unique array identifier. Each thread is assigned to process one or more of the input data elements, and an input data element for a given thread is selected based on the unique thread identifier and the unique array identifier associated with the thread. The parallel processing hardware is used to execute the thread arrays to process the input data stream and write an output data stream to the memory. During execution, the threads of the thread array are organized into one or more SIMD groups, wherein at least a first one of the SIMD groups includes a plurality of threads, and the input data elements for all threads of the first SIMD group are retrieved from the memory in a single memory access operation.

In a still further aspect, a system for processing an input data stream having a number of input data elements includes a memory and a parallel processing unit communicatively coupled to the memory. The memory is adapted to store data including input data elements of an input data stream. The parallel processing unit is adapted to concurrently execute a number of thread arrays. Each thread array includes a number of concurrent threads, with each thread having a unique thread identifier and each thread array having a unique array identifier. Each thread processes one or more of the input data elements, and an input data element for a given thread is selected based on the unique thread identifier and the unique array identifier associated with the thread. The parallel processing hardware is further configured to execute the threads of each thread array in one or more SIMD groups and to retrieve the respective input data elements for all threads of a same one of the SIMD groups in a single memory access operation.

The following detailed description together with the accompanying drawings will provide a better understanding of the nature and advantages of the present invention.

BRIEF DESCRIPTION OF THE DRAWINGS

FIG. 4 is a pseudocode fragment illustrating a technique for distributing work so as to maximize parallelism according to an embodiment of the present invention.

DETAILED DESCRIPTION OF THE INVENTION

Generally stated, provided herein are methods for achieving improved, optimized, or ultimately maximized memory throughput in memory-throughput-limited streaming computations on parallel processing devices. Streaming computation performance is maximized by optimizing the aggregate memory throughput across the plurality of processing elements and threads.

Exemplary Parallel Processing Architectures

Figure 1:
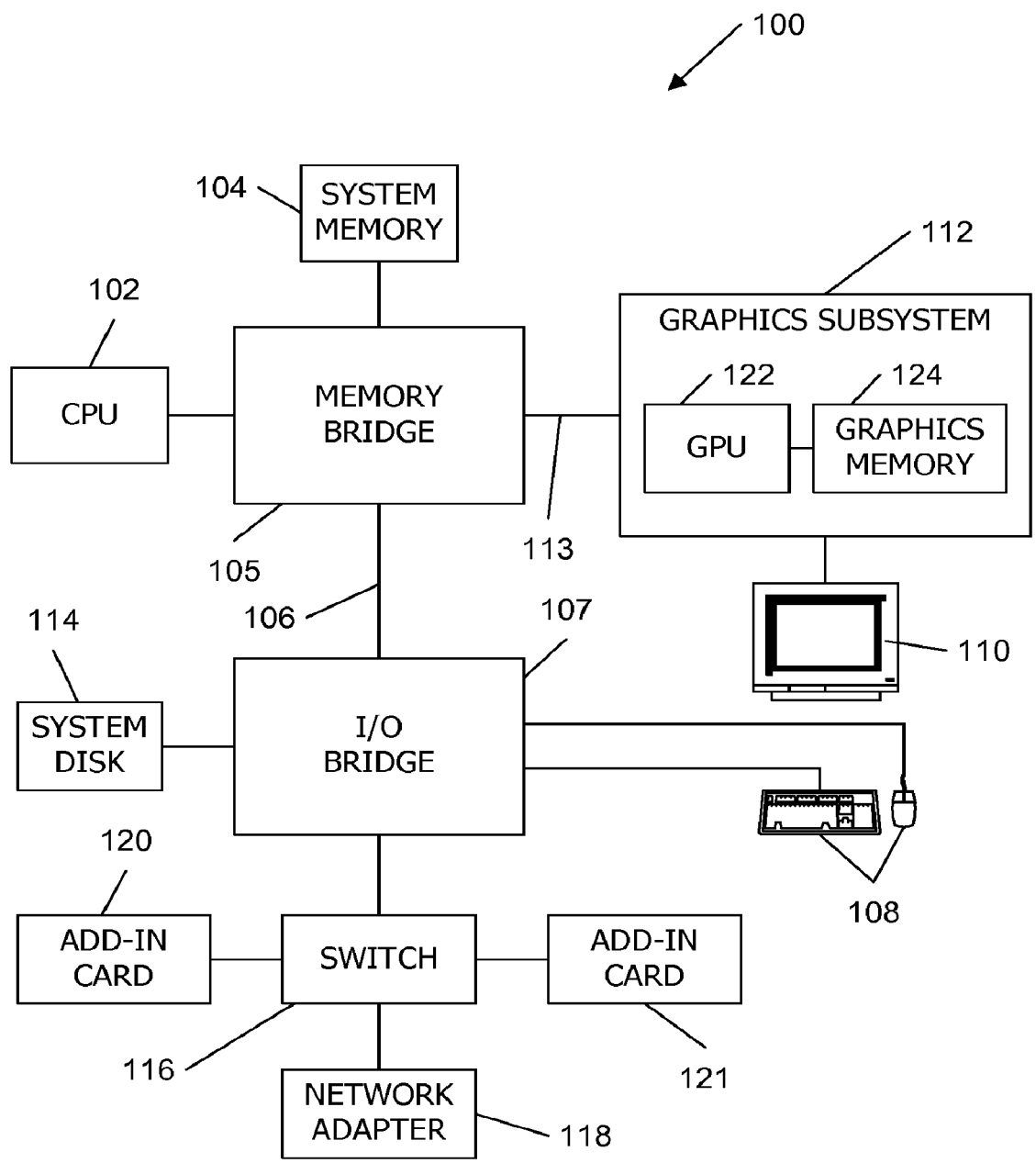
FIG. 1 is a block diagram of a computer system according to an embodiment of the present invention.
Figure 2:
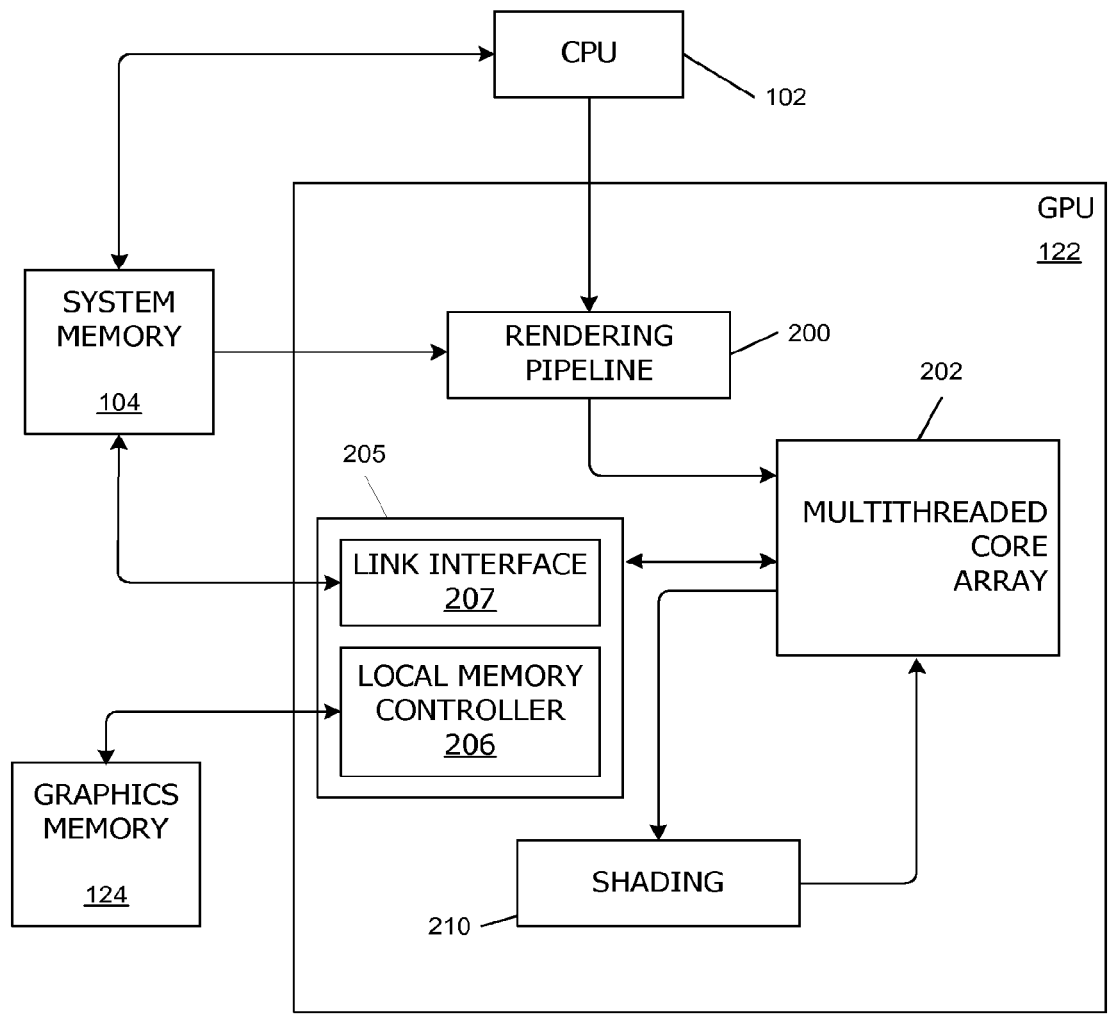
FIG. 2 is a generalized block diagram showing further detail of GPU of FIG. 1 according to an embodiment of the present invention.
Figure 3:
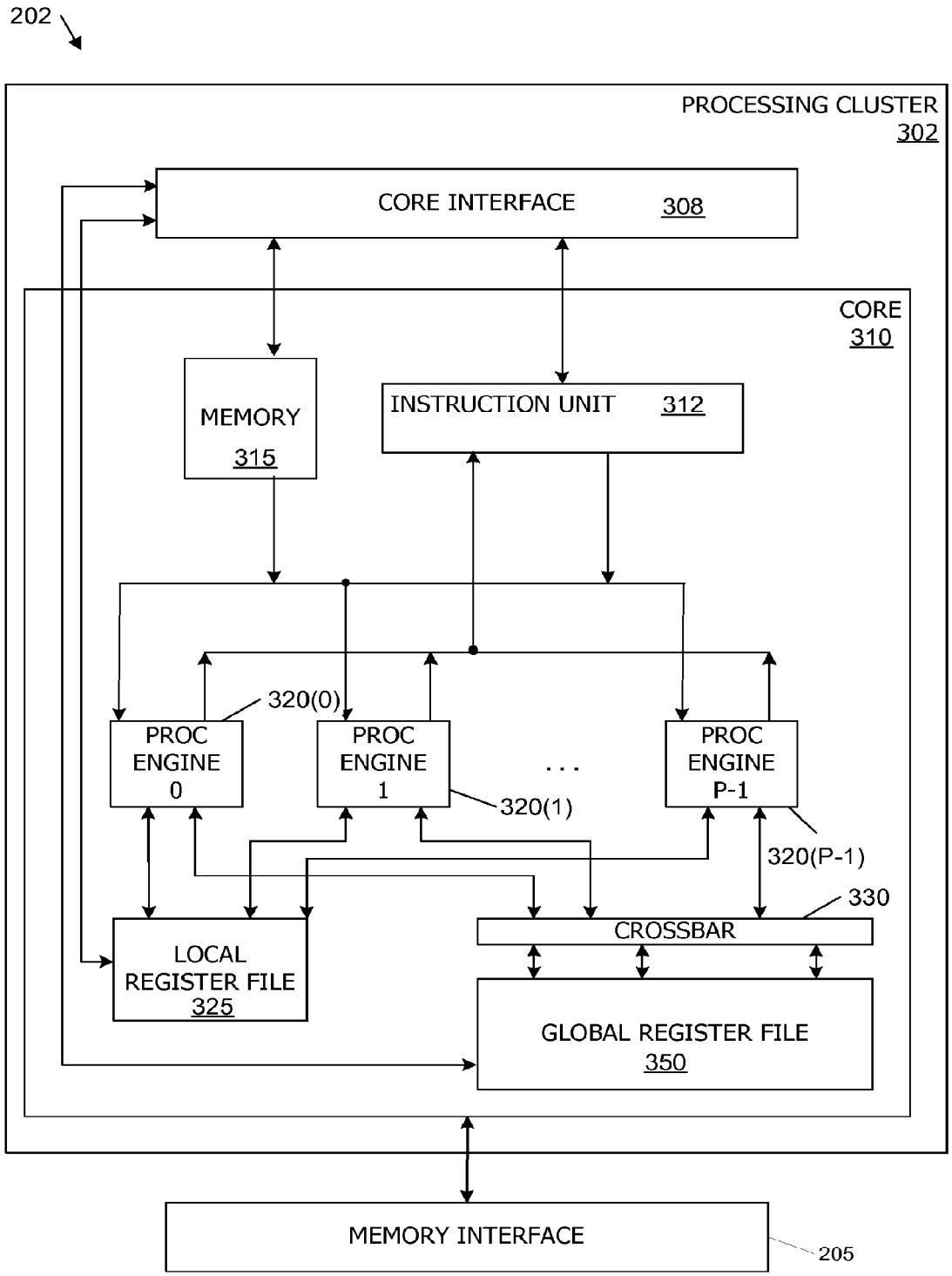
FIG. 3 is a generalized block diagram of multithreaded core array of FIG. 2 according to an embodiment of the present invention.

FIGS. 1 through 3 illustrate exemplary parallel processing architectures that support techniques for improved, optimized, or maximized memory throughput in streaming computations. The methods disclosed herein for maximizing memory throughput are not limited to any particular hardware architecture. For example, the architecture herein includes a computer system with a central processing unit (CPU) and a graphics processing unit (GPU) that supports parallel processing applications, such as for streaming computations. However, the methods described herein are not limited to application on a GPU and instead are applicable to virtually any parallel processing device. Further, as described below, the architecture of the GPU below includes a hierarchical arrangement for parallel processing of threads (lowest level), single-instruction multiple data (SIMD) groups of a number (e.g. 16) of threads, and cooperative thread arrays (CTAs) of a number of threads, although the techniques described herein may be applied to parallel processing of threads in non-hierarchical or "flat" arrangement.

FIG. 1 is a block diagram of a computer system 100 according to an embodiment of the present invention. Computer system 100 is merely exemplary, and a number of alterations may be made to computer system 100. Computer system 100 includes a central processing unit (CPU) or control processor 102 and a system memory 104 communicating via a communications path that includes a memory bridge 105. Memory bridge 105 (e.g. a Northbridge chip) is connected via a communication path 106 (e.g., a point-to-point connection using the HyperTransport protocol) to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105. Visual output is provided on a pixel based display device 110 (e.g., a CRT or LCD based monitor) operating under control of a graphics subsystem 112 coupled to memory bridge 105 via communication path 113, which may be implemented using, e.g., PCI Express (PCI-E), Accelerated Graphics Port (AGP), or any other point-to-point or bus protocol. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or bus protocol(s), and connections between different devices may use different protocols as is known in the art.

Graphics processing subsystem 112 includes a number N of graphics processing units (GPU) 122 and graphics memories 124, which may be implemented, e.g., using one or more integrated circuit devices such as programmable processors, application specific integrated circuits (ASICs), and memory devices. Each GPU 122 may be configured to perform various tasks related to generating pixel data from graphics data supplied by CPU 102 and/or system memory 104 via memory bridge 105 and bus 113, interacting with graphics memories 124 to store and update pixel data, and the like. For example, GPU 122 may generate pixel data from 2-D or 3-D scene data provided by various programs executing on CPU 102.

FIG. 2 is a generalized block diagram showing further detail of GPU 122 of FIG. 1 according to an embodiment of the present invention. In image processing mode, GPU 122 provides applications such as vertex shader programs, geometry shader programs, and pixel shader programs using parallel processing hardware, referred to herein as a "multithreaded core array" 202. GPU 122 provides image processing by way of a rendering pipeline 200, a shading module 210, and frame buffer 226. In one embodiment, multithreaded core array 202 provides a highly parallel architecture that supports concurrent execution of a large number of instances of vertex, geometry, and/or pixel shader programs in various combinations.

Detailed descriptions of such image processing components is not included herein so as to focus on applications for which GPU 122 provides general-purpose computing applications, such as streaming computations.

Multithreaded core array 202 of GPU 122 can perform general-purpose computations such as streaming computations, as described further herein. In one embodiment, any computation that can be expressed in a data-parallel decomposition can be handled by multithreaded core array 202 as an array of threads executing in a single core. One example of such computations is a streaming computation such as a BLAS-1 vector computation, as described further below.

In some embodiments, data elements of the stream are loaded by CPU 102 into system memory 104 or other memory (e.g. graphics memory 124 of FIG. 1) accessible to both CPU 102 and multithreaded core array 202. Multithreaded core array 202 communicates with a memory interface 205, which manages access to all off-chip memory, including system memory 104 and graphics memory 124. Memory interface 205 is a functional block that provides one or more gateways to off-chip memory for all processing engines in cores inside multithreaded core array 202; whenever any of the cores of multithreaded core array 202 needs to access off-chip memory, it does so through memory interface 205. Memory interface 205 may be a single memory interface with multiple channels, or may comprise multiple memory interface units. Although depicted as a functional block included in GPU 122, memory interface 205 may be partitioned into portions within and outside of GPU 122.

Memory interface 205 may use different mechanisms to access different areas of off-chip memory. For example, in some embodiments, memory interface 205 includes a local memory controller 206 to access frame buffer 226 in graphics memory 124, and a separate interface to system memory 104, e.g., an AGP or PCI-Express link interface 207. When multithreaded core array 202 requests access to off-chip memory, memory interface 205 enables the requested access to graphics memory 124 or system memory 104 such that accesses to graphics memory 124 are handled via local memory controller 206, while accesses to system memory 104 are directed to link interface 207. Memory interface 205 serves all of the cores of multithreaded core array 202, and in some embodiments, the cores can read input data from system memory 104 as well as graphics memory 124 and/or write results of their computations to system memory 104 and/or graphics memory 124 via memory interface 205.

Multithreaded Core Array Architecture

FIG. 3 is a generalized block diagram of multithreaded core array 202 of FIG. 2 according to an embodiment of the present invention. In this embodiment, multithreaded core array 202 includes a number (N) of processing clusters 302. Any number N (e.g., 1, 4, 8, or any other number) of processing clusters may be provided. In FIG. 3, one processing cluster 302 is shown in detail, other processing clusters 302 can be of similar or identical design.

Each processing cluster 302 includes image processing hardware (not shown) for pixel processing, and a core interface 308 that controls a number (M) of cores 310 that include the processing engines 320 of multithreaded core array 202. Any number M (e.g., 1, 2, 4 or any other number) of cores 310 may be connected to a single core interface. Each core 310 is advantageously implemented as a multithreaded execution core capable of executing a large number (e.g., 100 or more) of concurrent execution threads (where the term "thread" refers to an instance of a particular program executing on a particular set of input data), including image processing threads and/or general-purpose computing threads. In some embodiments, single-instruction, multiple-data (SIMD) instruction issue techniques are used to support parallel execution of a large number of threads without providing multiple independent instruction fetch units.

It will be appreciated that the multithreaded core array 202 described herein is illustrative and that variations and modifications are possible. Any number of processing clusters may be provided, and each processing cluster may include any number of cores.

In one embodiment, core 310 includes an array of P (e.g., 16) parallel processing engines 320 configured to receive SIMD instructions from a single instruction unit 312. Each parallel processing engine 320 advantageously includes an identical set of functional units (e.g., arithmetic logic units, etc.). The functional units may be pipelined, allowing a new instruction to be issued before a previous instruction has finished. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

In one embodiment, each processing engine 320 is multithreaded and can execute up to some number G (e.g., 24) of threads concurrently, e.g., by maintaining current state information associated with each thread. Processing engines 320 are advantageously designed to switch rapidly from one thread to another so that, for instance, a program instruction from one thread could be issued on one clock cycle, followed by a program instruction from a different thread or from a different type of thread, and so on.

Instruction unit 312 is configured such that, for any given processing cycle, the same instruction (INSTR) is issued to all P processing engines 320. Thus, at the level of a single clock cycle, core 310 implements a P-way SIMD microarchitecture. Since each processing engine 320 is also multithreaded, supporting up to G threads, core 310 in this embodiment can have up to P*G threads in process concurrently. For instance, if P=16 and G=24, then core 310 supports up to 384 concurrent threads.

Because instruction unit 312 issues the same instruction to all P processing engines 320 in parallel, core 310 is advantageously used to process threads in "SIMD groups." As used herein, a "SIMD group" refers to a group of up to P threads of execution of the same program on different input data, with one thread of the group being assigned to each processing engine 320. A SIMD group may include fewer than P threads, in which case some of processing engines 320 will be idle during cycles when that SIMD group is being processed. Since each processing engine 320 can support up to G threads, it follows that up to G SIMD groups can be in process in core 310 at any given time.

On each clock cycle, one instruction is issued to all P threads making up a selected one of the G SIMD groups. To indicate which thread is currently active, a "group index" (GID) for the associated thread may be included with the instruction. Thus, in a given cycle, all processing engines 320 in core 310 are nominally executing the same instruction for different threads in the same group. In some embodiments, an active mask is applied at instruction issue to control which processing engines 320 execute the instruction so that an instruction can be executed in parallel for a subset of the threads in the SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 312 and processing engines 320 with input data and/or other parameters required to execute the applicable program. Core interface 308 allocates sufficient space for an input buffer (e.g., in global register file 350 or local register file 325) for each processing engine 320 to execute, then loads data and/or parameters. In some embodiments, data and/or parameters for multiple threads in the group can be loaded in parallel. Once all the data and/or parameters for the group have been loaded, core interface 308 launches the SIMD group by signaling to instruction unit 312 to begin fetching and issuing instructions corresponding to the group index GID of the new group.

Each processing engine 320 may be allocated space in a local register file 325 for storing its local input data, intermediate results, and the like. The number of entries in local register file 325 is advantageously large enough to support multiple concurrent threads per processing engine 320. Some embodiments also provide an on-chip shared memory 315, which may be implemented, e.g., as a conventional RAM. In some embodiments, processing engines 320 may also have access to additional off-chip shared memory (not shown), which might be located, e.g., within graphics memory 124 or system memory 104 (FIG. 1).

Each processing engine 320 also has access, via a crossbar switch 330, to a global register file 350 that may be shared among all of the processing engines 320 in core 310. Global register file 350 may be as large as desired, and in some embodiments, any processing engine 320 can read to or write from any location in global register file 350.

Processing core 310 communicates with memory interface 205, allowing the processing engines 320 to access off-chip memory such as system memory 104 and/or graphics memory 124. In one embodiment, memory interface 205 includes a local memory controller 206 (shown in FIG. 2) that has multiple ports, and each processing core 310 uses a different port of local memory controller 206. Other embodiments are also possible. For example, two or more cores 310 might share a port. Assignment of cores 310 to ports of memory controller 206 can be static or dynamic as desired.

Cooperative Thread Arrays (CTAs)

In accordance with an embodiment of the present invention, core 310 can be leveraged for general-purpose computations by executing cooperative thread arrays (CTAs). As used herein, a "CTA" is a group of multiple threads that concurrently execute the same program on an input data set to produce an output data set. Each thread in the CTA is assigned a unique thread identifier ("thread ID" or "TID") that is accessible to the thread during its execution. The TID controls various aspects of the thread's processing behavior. For instance, as described further herein, the TID may be used to determine which portion of an input data stream a thread is to process, and/or to determine which portion of an output data stream the thread is to produce or write.

CTAs are advantageously employed to perform computations that lend themselves to a data parallel decomposition, i.e., application of the same processing algorithm to different portions of an input data set in order to effect a transformation of the input data set to an output data set. Streaming computations are one example of such data parallel decompositions. The processing algorithm is specified in a "CTA program." A CTA program can implement algorithms using a wide range of mathematical and logical operations, and the program can include conditional or branching execution paths and direct and/or indirect memory access. Threads in a CTA can share intermediate results with other threads in the same CTA using global register file 350, which is accessible to all of the threads.

In some embodiments, the CTA program includes an instruction to compute an address to which particular data is to be written, with the address being a function of thread ID. Each thread computes the function using its own thread ID and writes to the corresponding location. The function is defined such that different threads write to different locations; as long as the function is deterministic, the location written to by any thread is well-defined. The CTA program can also include an instruction to compute an address from which data is to be read, with the address being a function of thread ID. By defining suitable functions, data can be written to a given location by one thread and read from that location by a different thread in a predictable manner. Consequently, any desired pattern of data sharing among threads can be supported, and any thread in a CTA can share data with any other thread in the same CTA.

Since all threads in a CTA execute the same program, any thread can be assigned any thread ID, as long as each valid thread ID is assigned to only one thread. In one embodiment, thread IDs are assigned sequentially to threads as they are launched. As long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In addition to thread IDs, some embodiments also provide a CTA identifier ("CTA ID") that is common to all threads in the CTA. A CTA identifier can be helpful to a programmer, e.g., where an input data set is to be processed using multiple CTAs that process different (possibly overlapping) portions of an input data set. The CTA ID may be stored in a local register of each thread, in a state register accessible to all threads of the CTA, or in other storage accessible to the threads of the CTA such as global register file 350.

While all threads within a CTA execute concurrently, there is no requirement that different CTAs execute concurrently, and the hardware need not support sharing of data between threads in different CTAs. The size of a CTA and number of CTAs required for a particular application depends on the application. Thus, the size of a CTA, as well as the number of CTAs to be executed, are defined by the programmer and provided to core 310 and core interface 308 as state parameters. CTAs are described in further detail in co-pending application Ser. No. 11/305,178, entitled, "Parallel Data Processing Systems and Methods Using Cooperative Thread Arrays," filed Dec. 15, 2005, incorporated by reference herein for all purposes.

Methods for Maximized Memory Throughput

A data "stream," as used herein, refers to a sequence of data elements (or simply "elements"), each of which is processed independently of all other elements in the stream. An element can be a single data value or a group of data values. The stream can have any length desired and might be, e.g., a vector. When processing a data stream using one or more CTAs, each thread of each CTA processes a different subset of elements of the data stream. A thread will generally read its assigned element, perform some processing, write back a result corresponding to the element, then proceed to its next assigned element until the entire stream is processed. Processing of each data element may not be computationally intensive, and thus computation may a take relatively small amount of time as compared to memory access times required to read the stream and write the results. Where this is the case, memory throughput limits the performance of the streaming computation. Generally stated then, the following methods achieve maximized memory throughput in such memory-throughput-limited streaming computations. Streaming computation performance is maximized by optimizing the aggregate memory throughput across the plurality of processing elements and threads. Such methods are broadly applicable across a wide range of parallel processing devices; however, for purposes of illustration, examples will be described with respect to the multithreaded core array of FIGS. 2-3.

Two aspects of distributing work are addressed in the embodiments disclosed herein. One is distributing work across the available processing engines so as to exploit the available parallelism of the parallel processing hardware. This involves, e.g., optimizing the number of CTAs and number of threads per CTA so as to keep all processing engines 320 in each core 310 busy to the extent possible. Another is controlling the pattern of memory accesses so that the threads can access memory with minimal conflict with other threads.

Work distribution will be discussed first. In streaming computations on a parallel processing device such as core 310 (FIG. 3), the stream length (e.g. for BLAS-1, the vector length) can vary widely based on the requirements of a particular application. It is thus desirable to construct a mechanism that distributes work to processing engines 320 and threads in such a fashion as to achieve optimal throughput for a given stream length based on specific characteristics of the parallel processing device such as core 310.

Such characteristics of the parallel processing device include:

(1). Granularity imposed on the number of threads in a CTA, which may be a hard limit or a soft limit. Threads may be allocated and executed in SIMD groups to simplify resource allocation and thread scheduling. The width of the SIMD groups (e.g. 16 threads) imposes a constraint on the granularity of threads in a CTA, with 1 to 24 SIMD groups of 16 threads each. Another soft constraint is that performance drops off quickly in some embodiments if "odd" numbers of threads are running (due to lack of coalescing etc). Coalescing of memory accesses (e.g., to graphics memory 124, as discussed with respect to FIG. 2) or gather/scatter operations across threads may be limited to at most "T" threads.

(2). Thread grouping. To simplify the scheduling of large numbers of threads onto processing engines 320, and simplify resource allocation within each processing engine 320, individual threads or SIMD groups may be grouped in a CTA prior to execution.

(3). Maximum number of threads per CTA. The upper limit on the number of threads that can be contained in a CTA in some embodiments is determined by the number of concurrent threads that a single core 310 can support, which might be, e.g., 384, 512, 768 or some other number. However, there may be additional limitations based on resource sharing between threads and/or per-thread resource requirements. For example, each thread belonging to a CTA may require a certain amount of on-chip memory, thus limiting the number of threads that can be active within the CTA.

In general, the granularity (1) may be derived from hardware limitations of the parallel processing device, while (2) and (3) may be a function of the particular streaming computation. More particularly, (1) Thread granularity (how many threads per SIMD group) is typically, but not necessarily, a function of the hardware organization (e.g. 16 processing elements per core implies threads grouped into SIMD groups of 16 threads each).
(2) Number of SIMD groups (and thus threads) per CTA is often, but not always, a function of the particular streaming computation. In some cases a hardware limit may be reached (24 SIMD groups=768 threads). (3) Number of CTAs launched is normally a function of the particular streaming computation. In some embodiments, there is also a limit on the number of CTAs that can be executed in parallel, e.g., one CTA per processing core if each CTA includes the maximum number of threads.

Therefore, maximizing memory throughput for streaming computations on a parallel processing device such as core 310 is done by maximizing parallelism among CTAs scheduled onto cores. SIMD groups get scheduled onto the processing engines such that each thread is mapped to a particular processing engine (thus the close relationship between the number of processing engines per core and the number of threads in a SIMD group).

To maximize memory throughput, four cases can be distinguished, depending upon stream length. For a relatively trivial case in which the stream length has fewer elements than the maximum number of CTAs, not all ports of the memory controller may be occupied (assuming each core 310 has a dedicated port in the memory controller 205). Where the number of stream elements exceeds this case, a first goal is to make sure all cores are "occupied" by a CTA to make full use of the ports of the memory controller. Once the maximum number of CTAs is reached, a second goal is to make the number of threads in each CTA as equal as possible, to ensure that each CTA does roughly the same amount of work, thus maximizing parallelism. A third goal is to ensure that each thread roughly accesses the same number of elements, to maximize parallelism.

FIG. 4 is a pseudocode fragment 400 illustrating a technique for distributing work so as to maximize parallelism according to an embodiment of the present invention. Pseudocode fragment 400 that tries to satisfy the goals mentioned above (use all memory ports, spread work equally across CTAs, spread work equally across threads) for each range of stream lengths. In some instances, the goals are trivially satisfied (such as by assigning one stream element to each thread). The specific distribution techniques differ in how they achieve those goals, as the optimal solution depends on length of the data stream.

Pseudocode fragment 400 uses the following inputs:
n is the number of elements in the data stream to be processed.

tMin is the minimum number of threads per CTA. While in principle a CTA could be defined with only one thread, the SIMD instruction issue of core 310 makes it logical to require that each CTA includes at least enough threads to fully populate a SIMD group. Thus, tMin in one embodiment is P (e.g., 16).

tMax is the maximum number of threads to be allowed per CTA. This can be set to correspond to a number of threads sufficient to keep core 310 fully occupied (e.g., 128), accounting for memory access latency and the like, rather than to the hardware-imposed upper limit on number of threads in a CTA, which is generally larger (e.g., 768). Alternatively, tMax can be set to a value that allows core 310 to run multiple CTAs (of tMax threads each) concurrently. This provides added flexibility in assigning work to cores 310.

gridW is the maximum number of CTAs that can be executing in parallel. This is dependent on the algorithm, and typically a multiple of the number of cores in the multithreaded core array.

Pseudocode fragment 400 uses these inputs to determine the following parameters:
nbrCtas is the number of CTAs to use.
elemsPerCta is the number of data elements to be processed by each CTA.

threadsPerCta is the number of threads to be used in each CTA, also referred to as "size" of the CTA. The assignment of specific elements of the data stream to specific threads within a CTA is discussed below.

Segment 402 addresses the case where the number of elements of the stream n is less than the minimum number of threads per CTA, tMin. In this case, one CTA with tMin threads is advantageously used to process the n elements.

Segment 404 addresses the next case, where n is larger than tMin (so that multiple CTAs are desirable) but small enough that there are too few elements to get CTAs started on all cores since each CTA must run at least tMin threads, and each thread must handle at least one element (except for end cases). In this case, each CTA has the minimum number of threads and each thread processes one element (hence elemsPerCta=threadsPerCta). The number of CTAs follows naturally as (n+tMin−1)/tMin.

Segment 406 addresses the case where n includes enough elements to get CTAs started on all cores (i.e., more than gridW*tMin) but not more than the number of threads in gridW CTAs if each CTA has tMax threads. In this case, the maximum number of CTAs is used. The number of threads per CTA is set to divide the work approximately equally among the CTAs, and each thread processes one element.

Finally, segment 408 addresses the case where stream length n exceeds the maximum number of CTAs times the maximum number of threads per CTA. In this case, the maximum number of CTAs (gridW) is used, and each CTA has the maximum number of threads (tMax). The number of elements per CTA in this case exceeds tMax, so each thread processes multiple elements.

It will be appreciated that the pseudocode fragment described herein is illustrative and that variations and modifications are possible. The hierarchy of parallelism including threads, SIMD groups, and CTAs is used by way of example; the technique can be extended to other hardware configurations with support for different types of parallelism. All specific parameter values are merely examples and may be modified without restriction.

"Base+TID" Access Pattern

The technique illustrated in FIG. 4 determines an optimal number of CTAs, number of threads per CTA and number of elements per CTA. The elements to be processed by a CTA are advantageously distributed among the threads of that CTA as equally as possible, so that each thread does an equal or nearly equal amount of work. To maximize memory throughput, attention is advantageously given to the assignment of elements to specific threads in specific CTAs. The optimal assignment depends in part on the memory interface and/or the particular structure of the memory that stores the data stream. Examples will now be described with reference to the parallel processing architecture of FIGS. 2 and 3.

In embodiments described herein, the memory that stores the data stream (e.g., graphics memory 124 or system memory 104) is byte-addressed. The data stream is stored contiguously in the address space, and each element may be, e.g., 1, 2, 4 or some other number of bytes. A thread reads or write an element in a single access. The memory advantageously supports "wide aligned access," i.e., accessing contiguous regions of address space that are aligned to appropriate boundaries, up to some maximum width. The width is advantageously large enough that a memory request for each thread of a SIMD group could be satisfied in a single access provided that all requests for the group target contiguous memory locations. For example, if a SIMD group is 16 threads and each thread requests 4 bytes, a 64-byte wide aligned access would provide enough data to satisfy all requests for the group in a single access.

In some embodiments, efficient memory access is provided, per SIMD group, by implementing a "Base+TID" (Base+thread ID) memory access pattern that maximizes the utilization of hardware resources accessing memory locations for the processing engines 320. In Base+TID addressing, each thread reads an address that is a function of its thread ID (a number), and threads in the same SIMD group have consecutive thread IDs. Each thread computes an address to read (or write) as a function of its thread ID; the function is defined so that the addresses are contiguous memory locations accessed such that increasing addresses correspond to increasing thread ID. In some embodiments, the thread IDs in a given SIMD group are given by $$TID=16*x+y, \quad (1)$$

where x is a SIMD group index (e.g., $0 \leq x < 24$) that is the same for all threads in a SIMD group, and y is a per-thread index (e.g., $0 \leq y < 15$) that is different for each thread in a SIMD group.

"Base+TID" addressing means that, if base is a starting address for a SIMD group the resulting memory accesses for the threads in the group would be at addresses:

$$base+y*4 // \text{for 32-bit access;} \quad (2a)$$

$$base+y*8 // \text{for 64-bit access;} \quad (2b)$$

$$base+y*16 // \text{for 128-bit access;} \quad (2c)$$

or, more generally:

$$base+y*w // \text{for } w\text{-byte accesses.} \quad (2d)$$

With threads running in parallel on the multithreaded core array 202, hardware mechanisms are oriented to provide wide aligned accesses to memory with each access satisfying requests from multiple threads.

On each clock, issuing logic in each core 310 of multithreaded core array 202 selects a SIMD group of threads to execute on its P processing engines 320 during that cycle. An instruction that reads or writes a memory location in graphics memory 124 (or system memory 104 in some embodiments) generates P read or write requests at P addresses, one address per thread. If an entire SIMD group requests access to graphics memory 124 in the Base+TID access pattern, a single wide aligned access to graphics memory 124 in hardware can satisfy all of the requests for the group. In some embodiments, if a SIMD group of 16 (more generally P) threads does not follow the Base+TID access pattern, throughput to/from graphics memory 124 can go down significantly.

The Base+TID access pattern of Eq. (2d) is advantageously used for threads within a SIMD group. Where the CTA includes multiple SIMD groups, the base address assigned to different SIMD groups is advantageously determined as a function of x (the SIMD group index of Eq. (1)). For example, where only one CTA is used and each thread accesses one element, base can be defined as:

$$base=a_0+x*P*w, \quad (3)$$

where $a_0$ is the address of the first element of the data stream, P is the number of threads per SIMD group, and w is the size (in bytes) of each element that is accessed.

CTA Blocking

As described above with reference to FIG. 4, for long data streams, multiple CTAs may be used, and a single thread may process multiple elements. The assignment of particular elements to threads can depend in part on the memory structure.

In one embodiment, each CTA processes a contiguous subset of the data stream; this is referred to herein as "CTA blocking"

Figure 5:
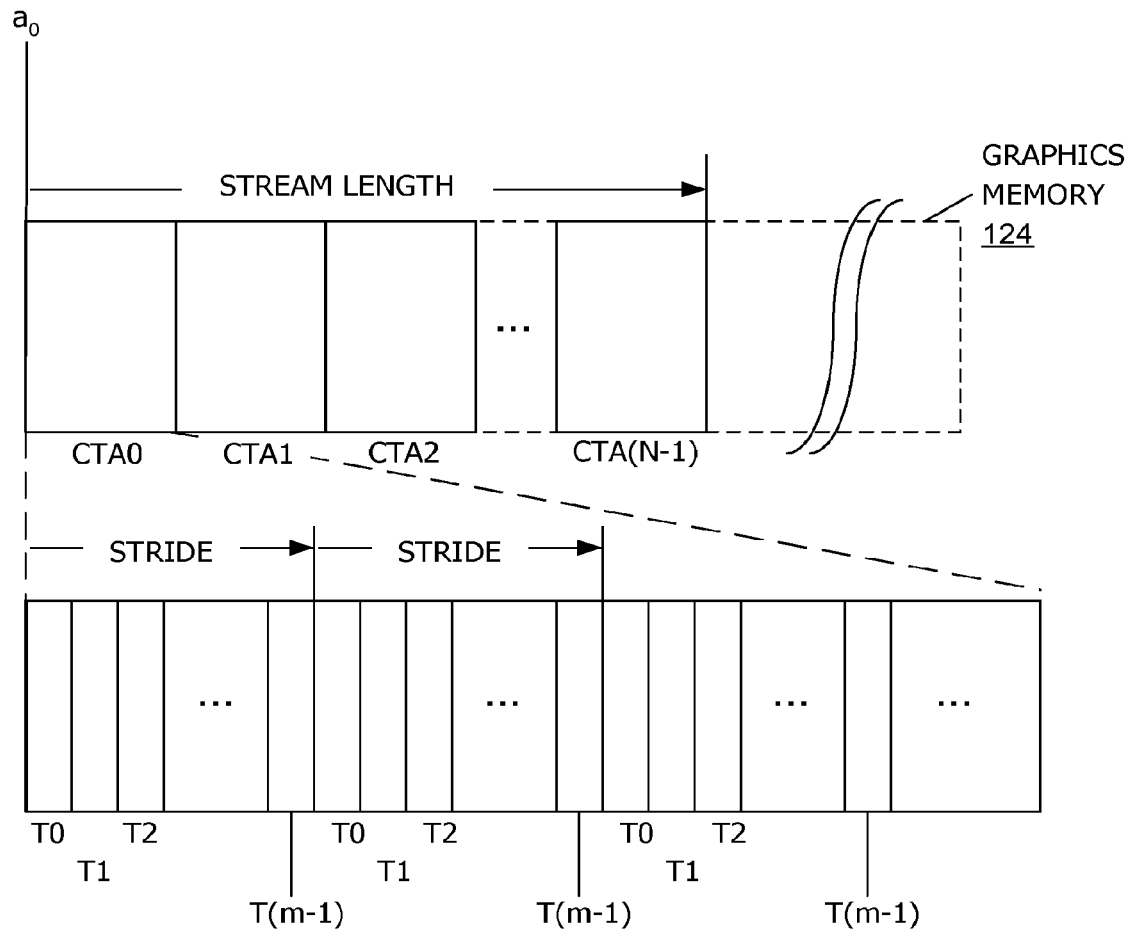
FIG. 5 illustrates Base+TID memory accesses across a data stream according to an embodiment of the present invention.

FIG. 5 illustrates CTA blocking for a data stream loaded into graphics memory 124 of FIG. 1 according to an embodiment of the present invention. In general, with a relatively large stream of data (e.g., BLAS-1 vector data) spanning a large portion of graphics memory 124, the CTA blocking technique divides the data stream into portions that are processed by SIMD groups inside each CTA and further subdivides the stream into threads within the CTAs. The mapping of CTAs to blocks of memory is based on the CTA ID (CID). For instance, an offset for each CTA can be defined as:

$$\text{offset} = \text{CID} * \text{elemsPerCTA} * w, \quad (4)$$

where CID is the CTA ID ($0 \leq \text{CID} < \text{nbrCtas}$) and elemsPerCTA is determined in accordance with pseudocode fragment 400 of FIG. 4 and w is the size in bytes of each data element.

If each thread accesses one element, the Base+TID access pattern described above is combined with the CTA-specific offset of Eq. (4), and the base becomes:

$$\text{base} = a_0 + \text{offset} + x * P * w. \quad (5)$$

In the case where a thread accesses multiple elements, the technique shown in FIG. 5 is used. In FIG. 5, the data stream stored in graphics memory 124 is assigned to CTAs numbered CTA0 to CTA(N-1). Within each CTA, the CTA is broken into threads T0 to T(m-1). Each thread accesses the next contiguous element of the data stream, as shown in expanded view for CTA0, and the pattern repeats within the CTA.

The base address for each SIMD group access corresponds to an address at an alignment boundary in graphics memory 124 suitable for the size of the wide-aligned hardware access by the memory interface 205. With Base+TID addressing, each thread (if it accesses more than one element) uses a stride based on threadsPerCTA to determine the next location to access. For instance, with 128 threads per CTA accessing a data stream stored as an array a[0:n-1] where n is the length of the stream, the threads access the following elements:

$$\begin{aligned} TID &= 0 \quad a[0], \quad a[128], \quad a[256], \ldots \\ TID &= 1 \quad a[1], \quad a[129], \quad a[257], \ldots \\ &\ldots \\ TID &= 127 \quad a[127], \quad a[255], \quad \ldots \end{aligned} \quad (6)$$

Then, in "units stride," successive threads within a CTA access the next available portion of the stream stored in graphics memory 124. Base+TID memory access determines which thread should access which location of memory. While individual threads access memory with non-unit stride (as indicated by the rows in Eq. (6)), in aggregate the threads in a CTA effect unit stride access (as indicated by the columns of Eq. (6)). Looked at another way, in CTA blocking, the set of data elements processed by a given CTA is a single contiguous subset of the data stream.

For CTA blocking, Base+TID addressing provides that each thread determines memory locations to access according to the following rule:

$$\text{for } (i = \text{startindex}; i < \text{elemsPerCta}; i {+}= \text{stride})\{\text{access } a[i];\} \quad (7)$$

where startindex=CTAstart+TID and stride=threadsPerCta. Here, CTAstart is the first element in graphics memory 124 to be processed by a given CTA, e.g., $a_0$+offset in accordance with Eq. (4) above. The "access a[i]" notation represents any memory access operation (e.g., read or write) that targets element a[i] of the data stream.

In other words, locations of the data stream in graphics memory 124 are allocated to the CTAs, and within each CTA, each thread "strides" through the stream stored in graphics memory 124 with a stride length based on the number of threads in the CTA. For example, with 128 threads, each thread would access or stride every 128th location in graphics memory 124. Each thread accesses graphics memory 124 based on its thread ID to maintain the Base+TID access pattern, which optimizes memory throughput for each CTA.

CTA Interleaving

In the CTA blocking embodiment of FIG. 5, each CTA accesses a contiguous region of memory. Depending on how the memory is structured, this can create problems and result in less than maximum throughput. For example, the memory might be partitioned across a number of memory devices (e.g., DRAM chips). Maximum throughput is achieved when traffic is evenly distributed across these partitions. The CTA blocking embodiment shown in FIG. 5 can result in accesses being localized to a subset of the partitions, leaving others idle. Where this is the case, the active subset of partitions may become overburdened, leading to increased memory latency and reduced throughput. To avoid this overburdening, a different technique for assigning data elements to threads, referred to herein as "CTA interleaving," can be used.

Figure 6:
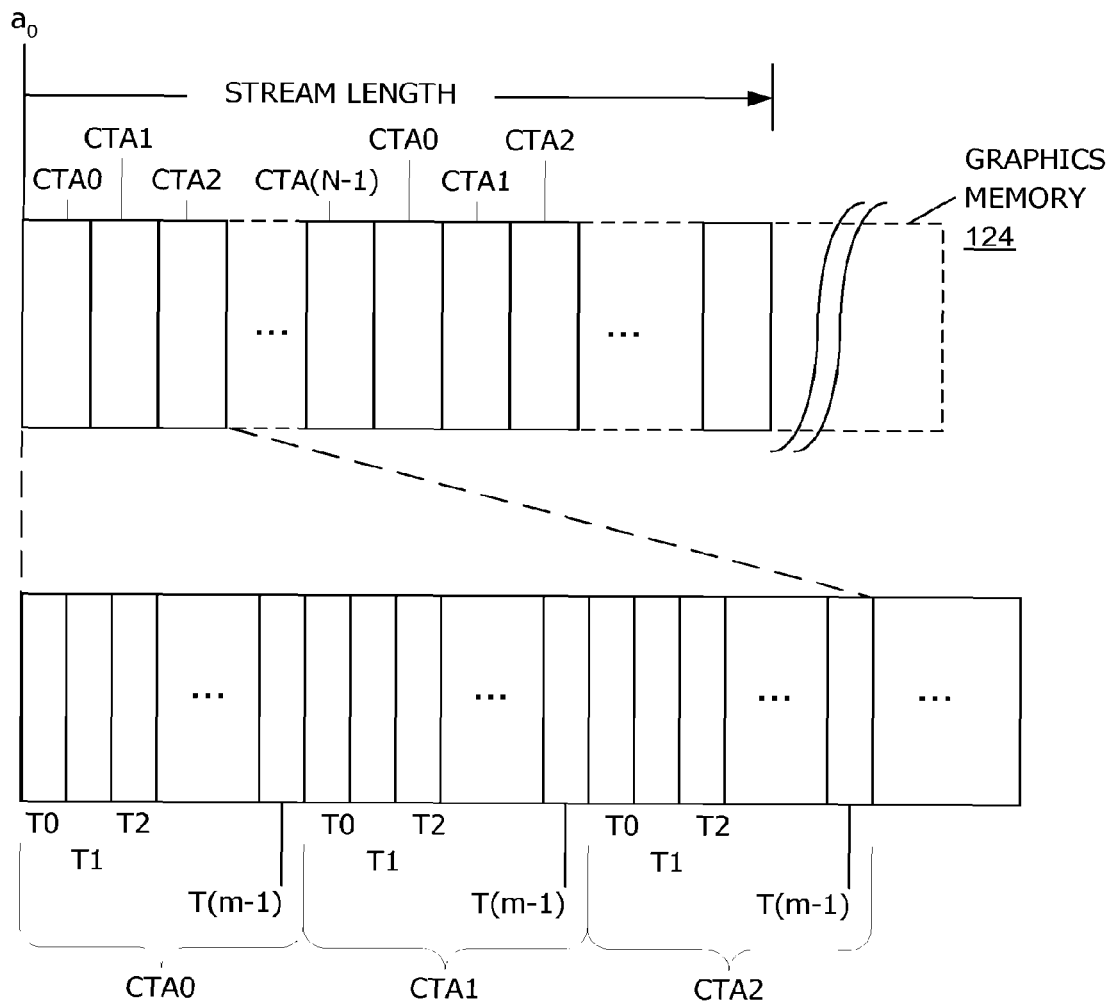
FIG. 6 illustrates interleaved memory accesses across a data stream according to an embodiment of the present invention.

FIG. 6 illustrates CTA interleaving for a data stream loaded into graphics memory 124 of FIG. 1 according to an embodiment of the present invention. In general, with a relatively large stream of data (e.g., BLAS-1 vector data) spanning a large portion of graphics memory 124, the CTA interleaving technique divides the data stream into contiguous blocks, with the number of elements in each block being equal to the number of threads in a CTA. Each block is assigned to a different CTA, and each element in a block is assigned to a different thread of the CTA. For instance, an offset for each CTA can be defined as:

$$\text{offset} = \text{CID} * \text{threadsPerCTA} * w, \quad (8)$$

where CID is the CTA ID ($0 \leq \text{CID} < \text{nbrCtas}$) and threadsPerCTA is determined in accordance with pseudocode fragment 400 of FIG. 4 and w is the size in bytes of each data element.

If each thread accesses one element, the Base+TID access pattern described above is combined with the CTA-specific offset of Eq. (8), and the base for each SIMD group becomes:

$$\text{base} = a_0 + \text{offset} + x * P * w, \quad (9)$$

In the case where a thread accesses multiple elements, the technique shown in FIG. 6 is used. In FIG. 6, the data stream stored in graphics memory 124 is assigned to CTAs numbered CTA0 to CTA(N-1). Within each CTA, the CTA is broken into threads T0 to T(m-1). Each thread accesses the next contiguous element of the data stream, as shown in expanded view for CTA0. Once one element has been assigned to each thread of CTA0, the next element is assigned to thread T0 of CTA1, and so on until each thread of each CTA has been assigned one element. The following element is then assigned to thread T0 of CTA0, and the pattern repeats.

The base address for each SIMD group access corresponds to an address at an alignment boundary in graphics memory 124 suitable for the size of the wide-aligned hardware access by the memory interface 205. With Base+TID addressing, each thread (if it accesses more than one element) uses a stride based on threadsPerCTA and nbrCTAs to determine the next location to access. For instance, with 4 CTAs of 128 threads each accessing a data stream stored as an array a[0:n−1] where n is the length of the stream, the threads of CTA0 access the following elements:

$$TID = 0 \quad a[0], \quad a[512], \quad a[1024], \ldots \quad (10)$$
$$TID = 1 \quad a[1], \quad a[513], \quad a[1025], \ldots$$
$$\ldots$$
$$TID = 127 \quad a[127], \quad a[639], \quad \ldots$$

Thus, the threads of CTA0, in aggregate, effect unit stride access across various 128-element swaths of the data stream, but different swaths are not contiguous, e.g., in Eq. (10), after a[127], CTA0 "skips" ahead to a[512]; elements a[128] through a[511] are processed by the other CTAs. Looked at another way, in CTA interleaving, each CTA processes a number of "swaths" of the data stream, where each swath is a contiguous subset of the data stream, but different swaths processed by the same CTA are not contiguous to each other. Depending on memory configuration and the number of threads per CTA, this can result in a situation where different CTAs (or cores 310) are more likely to be accessing different memory partitions in parallel, which improves throughput.

For CTA interleaving, Base+TID provides that each thread determines memory locations to access according to the following rule:

$$\text{for } (i=\text{startindex}; i<n; i+=\text{swath})\{\text{access } a[i];\} \quad (11)$$

where startindex is CTAstart+TID as in Eq. (7) above and swath is defined as threadsPerCta*nbrCtas.

It will be appreciated that the CTA blocking and CTA interleaving techniques described herein are illustrative and that variations and modifications are possible. For example, it is also possible to have embodiments where a CTA processes non-contiguous swaths of the data stream, e.g., by interleaving at the level of SIMD groups or "supergroups" defined as two or more SIMD groups. The optimum access pattern (CTA blocking, CTA interleaving, or other) for a given system depends upon the memory configuration, and patterns in which requests that are likely to arrive at or near the same time are widely distributed across the memory system may tend to produce better throughput. In general, the access pattern is specified in the (per-thread) CTA program code, which defines the functions that threads use to generate addresses for memory access operations.

Algorithm for Maximizing Memory Throughput

In this embodiment, maximum aggregate throughput to/from graphics memory 124 is achieved when all processing engines in multithreaded core array 202 are active and accessing memory using the Base+TID access pattern described above, with CTA blocking or CTA interleaving used so that all channels in memory interface 205 and as many memory partitions as possible are active. An algorithm for distributing work among CTAs will now be described.

In one embodiment, inputs to the algorithm for maximizing memory throughput for streaming computations on a stream stored in memory include:

(1). Maximum number of CTAs, CTAMax. CTAMax is determined based on the maximum number of concurrent threads at any given time, across the whole multithreaded core array 202 (not per core 310). In one embodiment, CTAMax corresponds to gridW in the pseudocode of FIG. 4. In some embodiments, CTAMax is determined based on hardware resource allocation, in particular, register requirements for CTAs. For example, in some embodiments, each core 310 has 8K (8,192) registers. Based upon the number of registers per core and the number of registers required per thread, the maximum number of threads and CTAs that can concurrently execute in a core may be determined. If there are multiple identical cores 310, CTAMax is the number of cores times the number of CTAs per core. If there are multiple cores that are not identical, then CTAMax is the sum over cores of the number of CTAs each core can concurrently execute.

CTAMax may be predetermined and passed into the algorithm as a parameter or computed by another algorithm. CTAMax may be determined and statically programmed (e.g., as a compile time constant) for a given piece of stream processing code based on the following procedure:

(a) determine register usage per thread (as indicated by compiler information in object code);

(b) multiply by tMax (maximum number of threads per CTA as defined above);

(c) divide the number of registers in the local register file 325 in each core (e.g., 8K) by the product computed in step (b); and (d) and use the floor (i.e., rounding down to integer) of the result as CTAMax.

(2). Maximum number of threads per CTA, tMax. In one embodiment, the maximum number of thread per CTA is limited by hardware to 768 threads. Other restrictions may cause tMax to be smaller. For example, if each thread needs resources of which there is a limited amount, tMax may be a smaller number than 768. Further, it may be advantageous to set tMax to the smallest number of threads that will keep a core fully occupied, as described above.

(3). Granularity of the number of threads in a CTA, tGran. tGran specifies the number of threads to allocate to a CTA for a maximally efficient access pattern in memory. In general, tGran=cardinality of a SIMD group (e.g., P). In one embodiment, tGran corresponds to tMin in the pseudocode of FIG. 4. tGran advantageously covers cases where the cardinality of the SIMD group is greater than the number of processing elements in a core. For example, the processing engines 320 in FIG. 3 can be clocked at a rate twice the "base clock" rate used for other components (e.g., instruction unit 312). With this "double clocking" of the processing elements, 8 processing elements can be used to process a 16-wide SIMD group every base clock cycle. The cardinality of the SIMD group advantageously corresponds to the width of an access by memory interface 205, to use full width accesses to memory.

(4). Length (number of elements) of the stream, n. "Stream," as used herein, is a generic term for a sequence of data elements to be processed using CTAs. For example, the stream may be a BLAS-1 vector of length n, a stream for a memcopy, an MPEG data stream, and so on.

In one embodiment, the outputs of the algorithm are:

(1). Number of CTAs to launch, CTACnt. In one embodiment, CTACnt is the same as nbrCtas of FIG. 4 above.

(2). Number of threads per CTA, tPerCTA. tPerCTA is advantageously a multiple of thread granularity (tGran) limited by tMax, the maximum number of threads per CTA. In one embodiment, tPerCTA is the same as threadsPerCta of FIG. 4 above.

(3). Number of stream elements to be handled by each CTA, elemsPerCTA. The number of stream elements to be processed by each CTA. This can be used by the threads in each CTA to control access stride and to determine when processing is complete.

Figure 7:
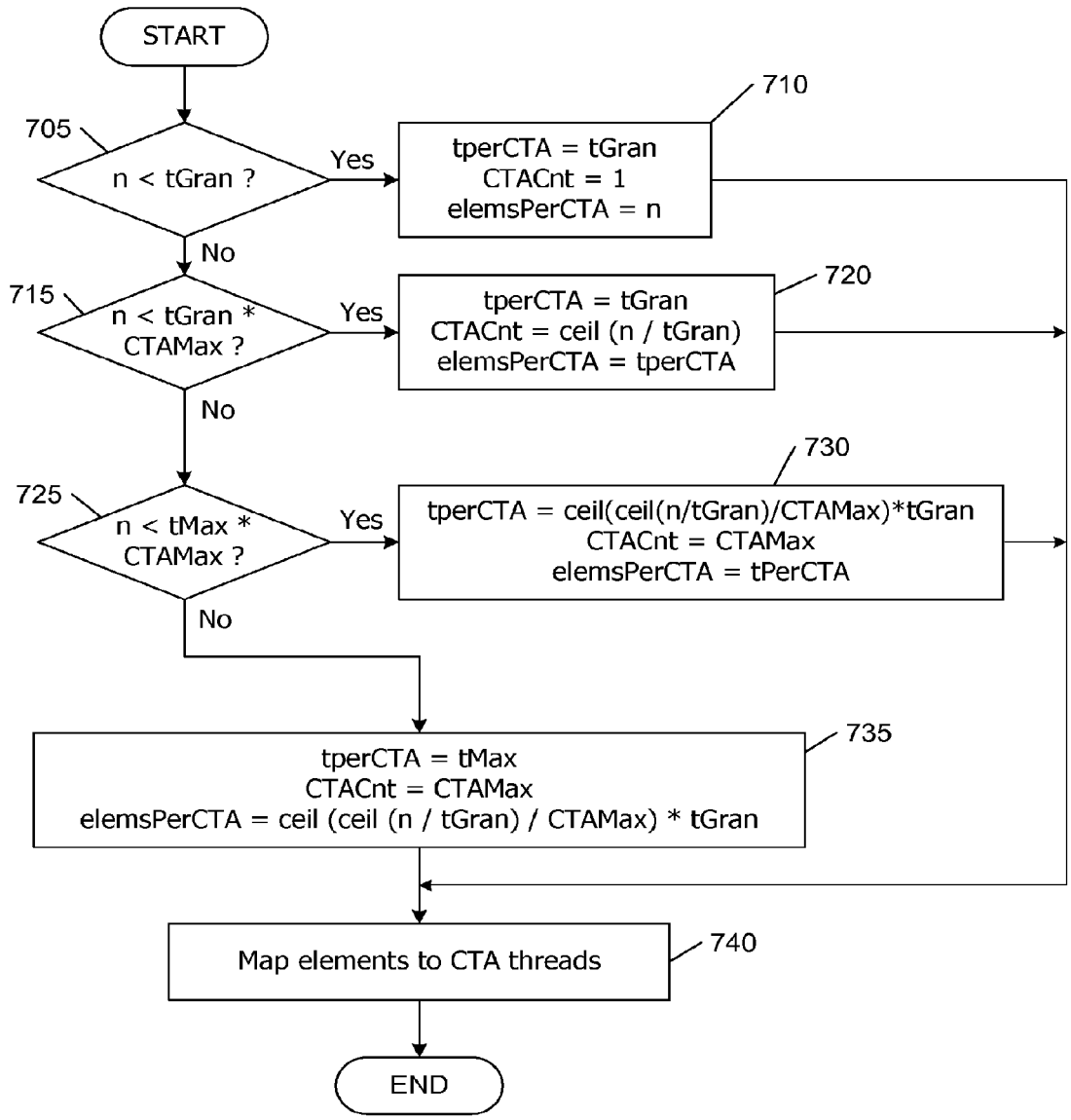
FIG. 7 illustrates an algorithm for computing the number of CTAs to launch, the number of threads per CTA, and the number of stream elements to be handled by each CTA to balance processing load across parallel processing devices according to an embodiment of the present invention.

FIG. 7 illustrates an algorithm for computing the number of CTAs to launch, the number of threads per CTA, and the number of stream elements to be handled by each CTA to balance processing load across parallel processing devices according to an embodiment of the present invention. In general, referring to FIGS. 2-3, as stream length n increases, the initial goal is to bring the maximum possible number of cores 310 online, so as to bring the maximum possible number of channels of memory interface 205 online for maximum aggregate memory throughput. This is done by increasing the number of CTAs while keeping each CTA at a minimum size. Once the limit on number of concurrent CTAs is met, then the goal is to increase the number of threads in each CTA in a fashion that keeps the maximum possible number of cores 310 and channels of memory interface 205 online. Up to this point with increasing stream length n, each thread is computing on one memory location (i.e., one data element), so keeping the maximum possible number of cores 310 online maximizes the hardware resources brought to bear on the stream. With further increasing stream length n, the question becomes how to distribute additional work (specifically, additional data elements) to each thread as the stream gets longer. Accordingly, four cases follow with increasing length n of the stream, as shown in FIG. 7.

First, at step 705, if n<tGran, then at step 710 tPerCTA=tGran, and CTACnt=1, since threads are started at least tGran at a time. The number of stream elements to be handled per CTA, elemsPerCTA=n.

At step 715, if n is greater than or equal to tGran but less than tGran*CTAMax, then at step 720, the number of CTAs running simultaneously is maximized without violating the constraint on granularity. This means tPerCTA=tGran, and CTACnt is ceil(n/tGran), where ceil( ) is the well-known integer "ceiling" function that rounds non-integer results up to the next integer. As in the previous case, elemsPerCTA=tPerCTA.

At step 725, if n is greater than or equal to tGran*CTAMax but less than tMax*CTAMax, then at step 730, the processing work is distributed as evenly as possible over CTAMax CTAs. Thus, CTACnt=CTAMax. In distributing the processing work among CTAs, the number of stream elements is less than the total number of threads supported by the multithreaded core array 202. Therefore, load balancing occurs if each CTA contains roughly the same number of threads while obeying the granularity restriction. This leads to tPerCTA=ceil(ceil(n/tGran)/CTAMax)*tGran. Each thread handles a single data element of the stream so that elemsPerCTA=tPerCTA.

At step 735, if n is greater than or equal to tMax*CTAMax, both the number of CTAs and the number of threads per CTA have reached their respective maxima supported by the multithreaded core array 202 for the computation. Thus, CTACnt=CTAMax, and tPerCTA=tMax. Balancing of work is achieved by assigning a roughly identical number of stream elements to each CTA, which leads to:

$$\text{elemsPerCTA}=\text{ceil}(\text{ceil}(n/\text{tGran})/\text{CTAMax})*\text{tGran}. \tag{12}$$

To operate on a stream of size n, multithreaded core array 202 launches CTACnt CTAs across the available cores 310, distributing the CTAs as equally as possible across cores 310. This is achieved by assigning the CTAs in cyclical fashion to eligible cores 310. Each CTA consists of tPerCTA threads. Within a given CTA, the threads are distributed as equally as possible across the processing engines 320 of the core 310 to which the CTA is assigned. This is achieved by assigning the threads in cyclical fashion to processing engines 320, such that each processing executes tPerCTA/P threads. (If tPerCTA is not a multiple of P, then some processing engines 320 execute ceil(tPerCTA/P) threads while the rest execute floor(tPerCTA/P) threads.

Finally, at step 740, the algorithm maps each element of a stream to a specific thread. This task uniquely identifies each CTA via a CTA ID (CID) that densely enumerates the CTAs, and a thread ID (T ID) that densely enumerates the threads in each CTA. For ease of implementation, some embodiments use 0-based enumeration. However, any other start value is possible since a non-zero start value can be subtracted prior to the processing described below to achieve a 0-based mapping.

The mapping part of the mechanism can use as inputs any or all of CTACnt, tPerCTA, elemsPerCTA, and n, as defined above. The particular mapping depends on the desired memory access pattern. By way of illustration, for the CTA blocking case depicted in FIG. 5, the starting stream element index CTAStart for a CTA CID is computed as:

$$\text{CTAStart}=\text{CID}*\text{elemsPerCTA}. \tag{13}$$

The ending stream element index CTAEnd for the range to be processed by the CTA CID is computed as:

$$\text{CTAEnd}=\min((\text{CTAStart}+\text{elemsPerCTA}),n). \tag{14}$$

An access stride is defined as $$\text{stride}=\text{tPerCTA}. \tag{15}$$

Each thread then accesses stream elements a[i] by iterating according to the following pseudocode:

$$\text{for }(i=\text{CTAStart}+\text{TID};\ i<\text{CTAEnd};\ i\mathrel{+}=\text{stride})\{\text{access } a[i]\}. \tag{16}$$

Note that this pseudocode for iterating corresponds to Eq. (7) above.

For the CTA interleaving case depicted in FIG. 6, the starting stream element index CTAStart is computed using Eq. (13). The ending stream element CTAEnd is computed as:

$$\text{CTAEnd}=n. \tag{17}$$

The access stride is defined as:

$$\text{stride}=\text{tPerCTA}*\text{CTACnt}. \tag{18}$$

Each thread then accesses stream elements a[i] by iterating according to the pseudocode of Eq. (16) above, using the CTAEnd and stride values defined in Eqs. (17) and (18).

In one embodiment, the computations pursuant to steps 705 through 735 of FIG. 7 are performed in software running on a general purpose processor such as CPU 102 (FIG. 1) which is coupled to the multithreaded core array 202. CPU 102 then provides the stimulus that causes multithreaded core array 202 to launch the computed number of CTAs and threads across the processing engines 320. CPU 102 also passes CTACnt, tPerCTA, elemsPerCTA, and stream length n to multithreaded core array 202.

When launching the threads in CTAs, multithreaded core array 202 generates thread IDs and CTA IDs, and passes this information to each thread launched. CTA program code executing on processing engines 320 includes code for iterating over elements that corresponds to the pseudocode of Eq. (16). The values of CTAStart, CTAEnd, and stride in a particular embodiment will be determined based on the optimal memory access pattern, which could be either CTA blocking, CTA interleaving, or other access patterns depending on the details of the memory architecture. By performing the iteration in accordance with Eq. (16), each thread accesses the designated stream elements, and each element is accessed by exactly one thread.

The "access a[i]" operation in the pseudocode of Eq. (16) is used herein to denote any memory access operation, including read operations, write operations, atomic read-modify-write operations, or the like. The CTA program code advantageously defines the operation(s) to be performed for each element accessed, and the details of such operations are not relevant to understanding the present invention. It is to be understood that each iteration of the pseudocode of Eq. (16) may include operating on an element of an input data stream to generate an element of an output data stream; the output data element can be written back to the input array (overwriting the corresponding input data element) or written to a different array in memory as desired. The access patterns described herein can advantageously be used for both reading and writing. Further, processing an element of a data stream could involve reading and/or writing multiple data values in the same array or different arrays, and those skilled in the art will appreciate that the techniques described herein can be applied to cases where a group of data values from a data stream is processed as a unit.

Alternative Embodiments

Various modifications may be made to the methods described herein. For example, although the algorithm above includes loops, the code need not be written as a loop, and the loop can be unrolled. In some embodiments, the algorithm is implemented in a software library that is called by an application program interface (API), so that the programmer of the computer system 100 need not know the details of mapping CTAs, SIMD groups, and threads to processing engines 320. The API takes inputs such as vector length, and the algorithm described herein computes how many CTAs to allocate, how many threads for each CTA, and so on. However, in some embodiments, the algorithm is "open" to the user. Alternatively, the algorithm may be implemented in hardware by a state machine for example, plus some computational hardware that can perform the steps described above, instead of having this controlled by a program running on the GPU. Similarly, a piece of computational hardware might perform the computation described above, instead of doing it in software on an CPU. As another alternative, registers may be preset to particular configuration values, including the number of CTAs to launch in one register, number of threads per CTA in another register, and so on, and the configuration registers may be read to start running the method against a stream in memory.

Further, while the embodiments described herein use a GPU as an example of parallel processing hardware, it is to be understood that other parallel processing devices could be used, including dedicated general-purpose co-processors as well as parallel processing hardware integrated with the CPU. The present invention can be practiced using any parallel processing hardware that supports multiple concurrent threads with any degree of parallelism; throughput will generally increase with a higher degree of parallelism and can approach the maximum memory bandwidth supported by the memory system and associated communication path(s).

Thus, while the invention has been described with respect to specific embodiments, it will be appreciated that the invention is intended to cover all modifications and equivalents within the scope of the following claims.

What is claimed is:

1. A method for processing an input data stream comprising a plurality of input data elements, the method comprising:
   storing the input data elements of the input data stream in memory;
   defining a number of thread arrays to be executed concurrently by parallel processing hardware, each thread array comprising a number of concurrent threads, each thread having a unique thread identifier and each thread array having a unique array identifier, wherein each thread is assigned to process one or more of the input data elements, a first input data element for a given thread being selected from an address in memory that is a function of the unique thread identifier and the unique array identifier associated with the thread, wherein the address in memory is determined by:
      dividing the input data stream stored in memory into a number of contiguous blocks, each block having a number of input data elements equal to the number of concurrent threads;
      assigning each block to a different thread array; and
      assigning each input data element to a concurrent thread in the thread array; and
   executing, using the parallel processing hardware, the number of thread arrays to process the input data stream and write an output data stream to the memory, wherein executing one of the plurality of thread arrays includes:
      organizing the threads of the thread array into a plurality of SIMD groups, wherein at least a first one of the SIMD groups includes a plurality of threads; and
      retrieving the input data elements for all threads of the first SIMD group from the memory in a single memory access operation.

2. The method of claim 1 wherein organizing the threads into the plurality of SIMD groups includes organizing the threads such that the threads in each one of the SIMD groups process a contiguous group of the input data elements.

3. The method of claim 1 wherein executing one of the plurality of thread arrays further includes:
   determining, for each thread of each SIMD group, a second data element of the input data stream to access, wherein the second data element for each thread of each SIMD group is separated from the first data element by a stride that is the same for all of the threads of all of the SIMD groups.

4. The method of claim 3 further comprising:
   defining the stride based on the number of threads in the thread array.

5. The method of claim 3 further comprising:
   defining the stride based on a total number of threads in all of the number of thread arrays.

6. The method of claim 5 wherein defining the stride includes computing a product of a number of threads per thread array times a total number of thread arrays and defining the stride based on the product.

7. The method of claim 1 wherein each of the threads in each of the number of thread arrays processes more than one of the input data elements.

8. The method of claim 7 wherein a set consisting of all of the data elements processed by the threads of one of the thread arrays is a contiguous subset of the input data stream.

9. The method of claim 7 wherein a set consisting of all of the data elements processed by the threads of one of the thread arrays includes at least a first subset of contiguous input data elements and a second subset of contiguous input data elements, wherein the first subset is not contiguous with the second subset.

10. The method of claim 1 wherein organizing the threads into the plurality of SIMD groups includes organizing the threads based on the respective thread identifiers assigned thereto such that each SIMD group consists of a number of threads with consecutive thread identifiers.

11. A system for processing an input data stream comprising a plurality of input data elements, the system comprising:
   a memory adapted to store data including input data elements of an input data stream;
   a parallel processing unit communicatively coupled to the memory and adapted to concurrently execute a plurality of thread arrays, each thread array comprising a plurality of concurrent threads, each thread having a unique thread identifier and each thread array having a unique array identifier, wherein each thread processes one or more of the input data elements, an input data element for a given thread being selected from an address in memory that is a function of the unique thread identifier and the unique array identifier associated with the thread, wherein the address in memory is determined by:
- dividing the input data stream stored in memory into a number of contiguous blocks, each block having a number of input data elements equal to the number of concurrent threads;
- assigning each block to a different thread array; and
- assigning each input data element to a concurrent thread in the thread array; and wherein the parallel processing hardware is further configured to execute the threads of each thread array in a plurality of SIMD groups and to retrieve the respective input data elements for all threads of a same one of the SIMD groups in a single memory access operation.

12. The system of claim 11 wherein the parallel processing hardware is further configured to write respective output data elements for all threads of the same one of the SIMD groups in a single memory access operation.

13. The system of claim 11 wherein the parallel processing unit is further configured such that threads executed in each one of the SIMD groups process a contiguous group of the input data elements.

14. The system of claim 11 wherein the parallel processing hardware is further configured such that each of the threads in each of the thread arrays processes more than one of the input data elements.

15. The system of claim 14 wherein the parallel processing hardware is further configured to select the two or more input data elements for each thread such that a set consisting of all of the data elements processed by the threads of one of the thread arrays is a contiguous subset of the input data stream.

16. The system of claim 14 wherein the parallel processing hardware is further configured to select the two or more input data elements for each thread such that a set consisting of all of the data elements processed by the threads of one of the thread arrays includes at least a first subset of contiguous input data elements and a second subset of contiguous input data elements, wherein the first subset is not contiguous with the second subset.

17. The method of claim 1 wherein each block is assigned to a different thread array such that increasing unique array identifiers correspond to increasing memory addresses.

18. The method of claim 1 wherein each block is assigned to a different thread array such that consecutive unique array identifiers correspond to consecutive memory addresses.

19. The system of claim 11 wherein each block is assigned to a different thread array such that increasing unique array identifiers correspond to increasing memory addresses.

20. The system of claim 11 wherein each block is assigned to a different thread array such that consecutive unique array identifiers correspond to consecutive memory addresses.

* * * * *